UNITED STATES PATENT OFFICE 2,552,993

KETODIMETHYLPERHYDROPHENAN-THRENE-CARBOXYLIC ACID NITRILES

Karl Miescher, Riehen, and Jean-René Billeter, Basel, Switzerland, assignors to Ciba Pharmaceutical Products, Inc., Summit, N. J.

No Drawing. Application September 26, 1949, Serial No. 117,954. In Switzerland October 8, 1948

4 Claims. (Cl. 260—464)

The present invention relates to 1-keto-2,13-dimethyl-perhydrophenanthrene - 2 - carboxylic acid nitriles of the general formula

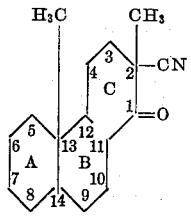

The new carboxylic acid nitriles may contain further substituents, especially in the 7-position a hydroxyl or a substituent convertible into such a group, for example, an etherified or esterified hydroxyl group and also a halogen atom, for example, in the 14-position. The invention is more especially concerned with the 1-keto-7-hydroxy-2,13 - dimethyl - 14 - perhydrophenanthrene - 2-carboxylic acid nitrile and 1-keto-7-hydroxy-14-chloro-2,13 - dimethyl - perhydrophenanthrene-2-carboxylic acid nitrile and the esters and ethers of these nitriles, for example, their acetates, propionates or benzoates.

The new compounds are obtained by treating a 1-keto-2,13-dimethyl - perhydrophenanthrene with a halogenating agent and reacting the resulting halide with a metal cyanide.

As starting materials there are used more especially 1-keto-2,13 - dimethyl - perhydrophenanthrene, which contain in the 7-position a hydroxyl or a substituent convertible into such a group, for example, an etherified or esterified hydroxyl group. Also very valuable are those starting materials which contain, in addition to the said substituents and a hydrogen atom in the 2-position, a halogen atom advantageously in the 14-position. Illustrative examples of starting materials according to the invention are 1-keto-7 - hydroxy - 2,13 - dimethyl - perhydrophenanthrene and 1-keto-7-hydroxy-14-chloro-2,13-dimethyl-perhydrophenanthrene and ethers or esters of these compounds, for example, their acetates, propionates or benzoates. These starting materials can be obtained, for example, by the oxidation of sterins and the further conversions by known methods of the compounds so obtained.

For the halogenation there are used especially halogens, such as bromine, in which case it is of advantage to work in an inert solvent, such as ether.

In the process of the invention the resulting halide, for example, a bromide, is treated with a metal cyanide, preferably an alkali metal cyanide such as potassium cyanide. This stage of the process is also carried out with advantage in a solvent. Thus, for example, an aqueous solution of a metal cyanide may be added to the halide in a diluent such as acetone or methanol.

The nitriles obtained by the present process are valuable intermediate products for the manufacture of therapeutically active compounds.

The following examples illustrate the invention, the parts being by weight:

Example 1

1-keto-7-acetoxy - 2,13 - dimethyl - 14 - trans-perhydrophenanthrene-2-carboxylic acid nitrile of the formula

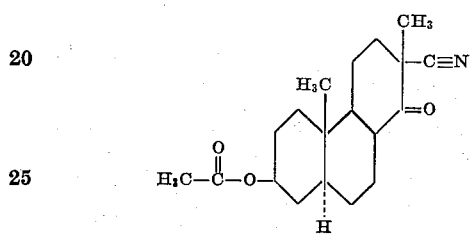

5.5 parts of bromine are added in the course of 30 minutes to a solution of 10 parts of 1-keto-7-acetoxy - 2,13 - dimethyl-14-trans - perhydrophenanthrene (having a melting point at 144° C.) in 250 parts of absolute ether, initially at room temperature and subsequently while cooling with ice. After the bromination, the whole is mixed with 200 parts of ice-water, the ethereal solution is washed with an ice-cooled solution of sodium bicarbonate, dried and evaporated, and the residue is recrystallized from methanol or acetone. 1 - keto-2-bromo - 7 - acetoxy-2,13-dimethyl - 14-trans-perhydrophenanthrene (having a decomposition point of 134° C.) is obtained in a yield of 80 per cent.

5 parts of 1-keto-2-bromo-7-acetoxy-2,13-dimethyl-14-trans-perhydrophenanthrene are dissolved in 50 parts of acetone and mixed with a solution of 4.5 parts of potassium cyanide in 12 parts of water. After 20 minutes 250 parts of water are added, whereby 1-keto-7-acetoxy-2,13-dimethyl - 14 - trans-perhydrophenanthrene-2-carboxylic acid nitrile is precipitated. The latter is separated by filtering with suction, and melts at 110–111° C. after recrystallization from aqueous alcohol.

When this nitrile is treated with a hydrolyzing agent there is obtained the 1-keto-7-hydroxy- 2,13-dimethyl-14-trans-perhydrophenanthrene-2-carboxylic acid nitrile.

In lieu of the 7-acetoxy-compound as used in the foregoing example, compounds having other acyloxy groups in the 7-position, such as propionyloxy or benzoyloxy groups or a free hydroxyl group may be used as starting material, whereby the 1-keto-7-propionoxy-, 1-keto-7-benzoyloxy-, and 1-keto-7-hydroxy-2,13-dimethyl-14-trans-perhydrophenanthrene-2-carboxylic acid nitrile, respectively, are obtained.

In the same manner, ethers, especially the 7-alkoxy-compounds, such as the 1-keto-7-methoxy-, 1-keto-7-ethoxy-, 1-keto-7-propyloxy- or 1-keto-7-benzyloxy-2,13-dimethyl-14-trans-perhydrophenanthrene-2-carboxylic acid nitrile may be prepared by starting from the corresponding 1-keto-7-methoxy-, 1-keto-7-ethoxy-, 1-keto-7-propyloxy- or 1-keto-7-benzyloxy-2,13-dimethyl-14-trans-perhydrophenanthrene. The latter may be prepared in a manner known as such by converting the 7-hydroxy compound into the 7-halogen-compounds and which in turn are treated with an appropriate alcoholate.

*Example 2*

1-keto-7-acetoxy-14-trans-chloro-2,13-dimethyl-perhydrophenanthrene-2-carboxylic acid nitrile of the formula

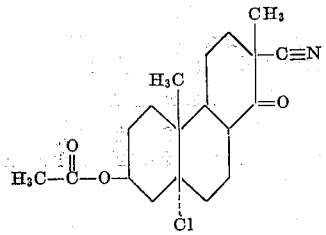

10.5 parts of 1-keto-7-acetoxy-14-trans-chloro-2,13-dimethyl-perhydrophenanthrene are suspended in 150 parts of ether, and halogenated with 5.2 parts of bromine as described in Example 1. The whole is then mixed with water, extracted with ether, and the ethereal solution is washed neutral, dried and evaporated. The 1-keto-2-bromo-7-acetoxy-14-trans-chloro-2,13-dimethyl-perhydrophenanthrene so obtained melts with decomposition at 135° C. after recrystallization from a mixture of acetone and methanol. The yield amounts to 8.5 parts.

8.5 parts of 1-keto-2-bromo-7-acetoxy-14-trans-chloro-2,13-dimethyl-perhydrophenanthrene are suspended in 60 parts of methanol, and mixed with a solution of 12 parts of potassium cyanide in 20 parts of water. After 20 minutes the product is precipitated with water, and the precipitate is separated with suction and recrystallized from a mixture of acetone and methanol. There are obtained 7 parts of 1-keto-7-acetoxy-14-trans-chloro-2,13-dimethyl-perhydrophenanthrene-2-carboxylic acid nitrile melting at 201° C.

The 1-keto-7-acetoxy-14-trans-chloro-2,13-dimethyl-perhydrophenanthrene used as starting material may be obtained by saturating at a low temperature the double bond of the $\Delta^{14,9}$-1-keto-7-acetoxy-2,13-dimethyl-dodecahydrophenanthrene with hydrogen chloride dissolved in a mixture of ethyl acetate and chloroform.

Having thus described the invention, what is claimed is:

1. A 1-keto-2,13-dimethyl-perhydrophenanthrene-2-carboxylic acid nitrile carrying in the 7-position a member selected from the class consisting of hydroxy, acyloxy, alkoxy and aryloxy groups.

2. A 1-keto-14-halogeno-2,13-dimethyl-perhydrophenanthrene-2-carboxylic acid nitrile carrying in the 7-position a member selected from the class consisting of hydroxy, acyloxy, alkoxy and aryloxy groups.

3. 1-keto-7-acetoxy-2,13-dimethyl-14-trans-perhydrophenanthrene-2-carboxylic acid nitrile.

4. 1-keto-7-acetoxy-14-trans-chloro-2,13-dimethyl-perhydrophenanthrene-2-carboxylic acid nitrile.

KARL MIESCHER.
JEAN-RENÉ BILLETER.

REFERENCES CITED

The following references are of record in the file of this patent:

Johnson: J. Am. Chem. Soc., vol. 67, pp. 2274–2275 (1945).